(12) United States Patent
Ichieda

(10) Patent No.: US 8,190,782 B2
(45) Date of Patent: May 29, 2012

(54) IMAGE DISPLAY SYSTEM AND IMAGE DISPLAY APPARATUS

(75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 371 days.

(21) Appl. No.: 12/420,145

(22) Filed: Apr. 8, 2009

(65) Prior Publication Data

US 2009/0251621 A1 Oct. 8, 2009

(30) Foreign Application Priority Data

Apr. 8, 2008 (JP) ................................. 2008-100433

(51) Int. Cl.
*G06F 13/12* (2006.01)
(52) U.S. Cl. ............................................. 710/5; 710/62
(58) Field of Classification Search ........................ None
See application file for complete search history.

(56) References Cited

U.S. PATENT DOCUMENTS

| | | | |
|---|---|---|---|
| 2004/0042138 A1* | 3/2004 | Saito et al. | 361/90 |
| 2006/0238724 A1* | 10/2006 | Trivedi | 353/119 |
| 2007/0222955 A1* | 9/2007 | Kubota | 355/18 |

FOREIGN PATENT DOCUMENTS

| | | |
|---|---|---|
| JP | 2006-285070 A | 10/2006 |
| JP | 2007-264079 A | 10/2007 |
| JP | 2007-299192 A | 11/2007 |

* cited by examiner

*Primary Examiner* — Cheng-Yuan Tseng
(74) *Attorney, Agent, or Firm* — AdvantEdge Law Group, LLC (57) ABSTRACT

An image display apparatus that displays an image in accordance with image data supplied from an image supplying apparatus, the image display apparatus including: a function module that processes input data; a plurality of disk images each including a function program which is executed by the image supplying apparatus and transmits data to the function module; and a selecting unit that selects one of the plurality of disk images; wherein the function program included in the disk image is executed by the image supplying apparatus that recognizes the disk image selected by the selecting unit; and the function module processes the data transmitted from the function program executed by the image supplying apparatus.

4 Claims, 5 Drawing Sheets

IMAGE DISPLAY SYSTEM AND IMAGE DISPLAY APPARATUS

The entire disclosure of Japanese Patent No. 2008-100433 filed Apr. 8, 2008 is expressly incorporated by reference herein.

BACKGROUND

1. Technical Field

The present invention relates to an image display system and an image display apparatus.

2. Related Art

Hitherto, a projector has been known that modulates the luminous flux emitted from a light source in accordance with the image data and projects the image light in large size to a projection surface such as a screen. The projector may often be used for projecting an image, which is to be displayed by a display unit of a PC (or a personal computer) connecting to the projector, in large size for a presentation in a meeting, for example. For the connection between the projector and the PC, a USB (or Universal Serial Bus) cable may often be used in recent years.

By the way, in order to make the projector project an image, which is an image displayed on a display unit of a PC, in large size, the PC must include an image transfer program that transfers the image data associating with the image displayed on the display unit to the projector side. However, the connection between the projector and the PC through a USB cable may require a special image transfer program supporting the projector to be connected. Therefore, a user must install the image transfer program to the PC by himself/herself, and the use of the projector may require the time and effort for that, which is a problem.

In order to solve the problem, a projector has been invented that holds the image transfer program and automatically causes the PC to execute the image transfer program (refer to JP-A-2007-264079, for example). The projector disclosed in the JP-A-2007-264079 includes a disk image. If the projector is connected to a PC, the PC recognizes the projector as a CD-ROM (or Compact Disc-Read Only Memory) drive and the PC can read data from the disk image stored in the projector. The disk image internally stores an image transfer program that obtains and transmits an image, which is displayed on the display unit of the PC, to the projector and an autorun program that causes the PC to execute the image transfer program. If the projector disclosed in JP-A-2007-264079 is connected to the PC, the PC recognizes the projector as a CD-ROM drive and executes the autorun program within the disk image read out from the projector. The autorun program automatically make the PC execute the image transfer program. This can reduce the time and effort by a user for installing the image transfer program in his/her PC, which can enhance the convenience of the projector.

However, the projector disclosed in JP-A-2007-264079 can only cause the PC to execute the image transfer program that obtains and transmits the image displayed on the display unit but is not capable of causing the PC to execute function programs having other functions.

SUMMARY

It is an advantage of the invention to provide an image display system and image display apparatus that can cause an image supplying apparatus to execute function programs having various functions.

According to an aspect of the invention, there is provided an image display system including an image display apparatus that displays an image in accordance with supplied image data and an image supplying apparatus that is connected to the image display apparatus and supplies the image data to the image display apparatus. In this case, the image display apparatus has a function module that processes input data, plural disk images each including a function program which is executed by the image supplying apparatus and transmits data to the function module, a selecting unit that selects one of the plural disk images and a switching unit that switches the disk image to be recognized by the image supplying apparatus to the disk image selected by the selecting unit from the plural disk images. The image supplying apparatus recognizes the disk image, which is selected by the selecting unit, and executes the function program included in the disk image. The function module processes the data transmitted from the image supplying apparatus executing the function program.

Notably, the image display apparatus and image supplying apparatus may be connected by radio through a USB cable or with a wireless USB and may be connected so as to allow the data communication therebetween.

According to the aspect of the invention, because the disk image to be recognized by the image supplying apparatus is switched by the switching unit to the disk image selected by the selecting unit from plural disk images, the image supplying apparatus can recognize the disk image selected by the selecting unit and can execute the function program included in the disk image. In other words, function programs having various functions can be executed. The data transmitted from the function program executed in the image supplying apparatus to the image display apparatus is processed by a function module in the image display apparatus. Therefore, in the image display system, without the installation by a user of the function programs to the image supplying apparatus, various functions can be implemented. This can enhance the convenience of the image display apparatus.

According to another aspect of the invention, there is provided an image display apparatus that displays an image in accordance with image data supplied from an image supplying apparatus, the image display apparatus including a function module that processes input data, plural disk images each having a function program to be executed by the image supplying apparatus, and transmits data to the function module, and a selecting unit that selects one of the plural disk images. The function program included in the disk image is executed by the image supplying apparatus that recognizes the disk image selected by the selecting unit. The function module processes the data transmitted from the function program executed by the image supplying apparatus.

According to the aspect of the invention, the similar configuration to the one described above can provide the similar effects as those described above when the image display apparatus is connected to the image supplying apparatus.

The image display apparatus according to the aspect of the invention preferably further includes a switching unit that switches the disk image recognized by the image supplying apparatus to the disk image, which is selected by the selecting unit from the plural disk images.

According to the aspect of the invention, the disk image recognized by the image supplying apparatus is switched by the switching unit, therefore, the image supplying apparatus connected to the image display apparatus can take a proper disk image from the image display apparatus.

The image display apparatus according to the aspect of the invention preferably further includes a connection control unit that disconnects between the image display apparatus and the image supplying apparatus before switching of the disk images by the switching unit and, after switching of the disk images by the switching unit, re-connects between the image display apparatus and the image supplying apparatus.

According to the aspect of the invention, when the switching unit switches the disk images to be recognized by the image supplying apparatus, the connection control unit disconnects between the image supplying apparatus and image display apparatus once. Therefore, the switching unit can securely switch the disk images to be recognized by the image supplying apparatus.

Preferably, in the image display apparatus according to the aspect of the invention, the image display apparatus and the image supplying apparatus are connected through a USB cable, and the connection control unit disconnects a pull-up resistor connected to a data line of the USB cable so as to disconnect between the image display apparatus and the image supplying apparatus and connects the pull-up resistor so as to connect between the image display apparatus and the image supplying apparatus.

According to the aspect of the invention, with the disconnection of the pull-up resistor by the connection control unit, the image supplying apparatus recognizes that it has disconnected from the image display apparatus even when the USB cable is still connected thereto. During the period of disconnection between the image display apparatus and the image supplying apparatus, in the image display apparatus, the switching unit switches the disk images, and, after the switching is performed, the connection control unit connects the pull-up resistor thereto. Therefore, the image supplying apparatus is allowed to recognize that it is connected to the image display apparatus, and the switched disk image can be more securely recognized by the image supplying apparatus. Furthermore, without pulling out and plugging in the USB cable, the image supplying apparatus is allowed to recognize the switched disk image. Therefore, the convenience of the image display apparatus can be enhanced more.

Preferably, in the image display apparatus according to the aspect of the invention, each of the disk images has an autorun program that causes the image supplying apparatus to execute the function program included in the disk image.

According to the aspect of the invention, each of the disk images may have an autorun program that causes the image supplying apparatus to execute the function program included in the disk image. Therefore, by causing the image supplying apparatus to execute the autorun program when the image supplying apparatus recognizes the disk image, the function program within the disk image selected by the selecting unit can be automatically executed by the image supplying apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to drawings, an embodiment of the invention will be described below.

Entire Configuration

Figure 1:
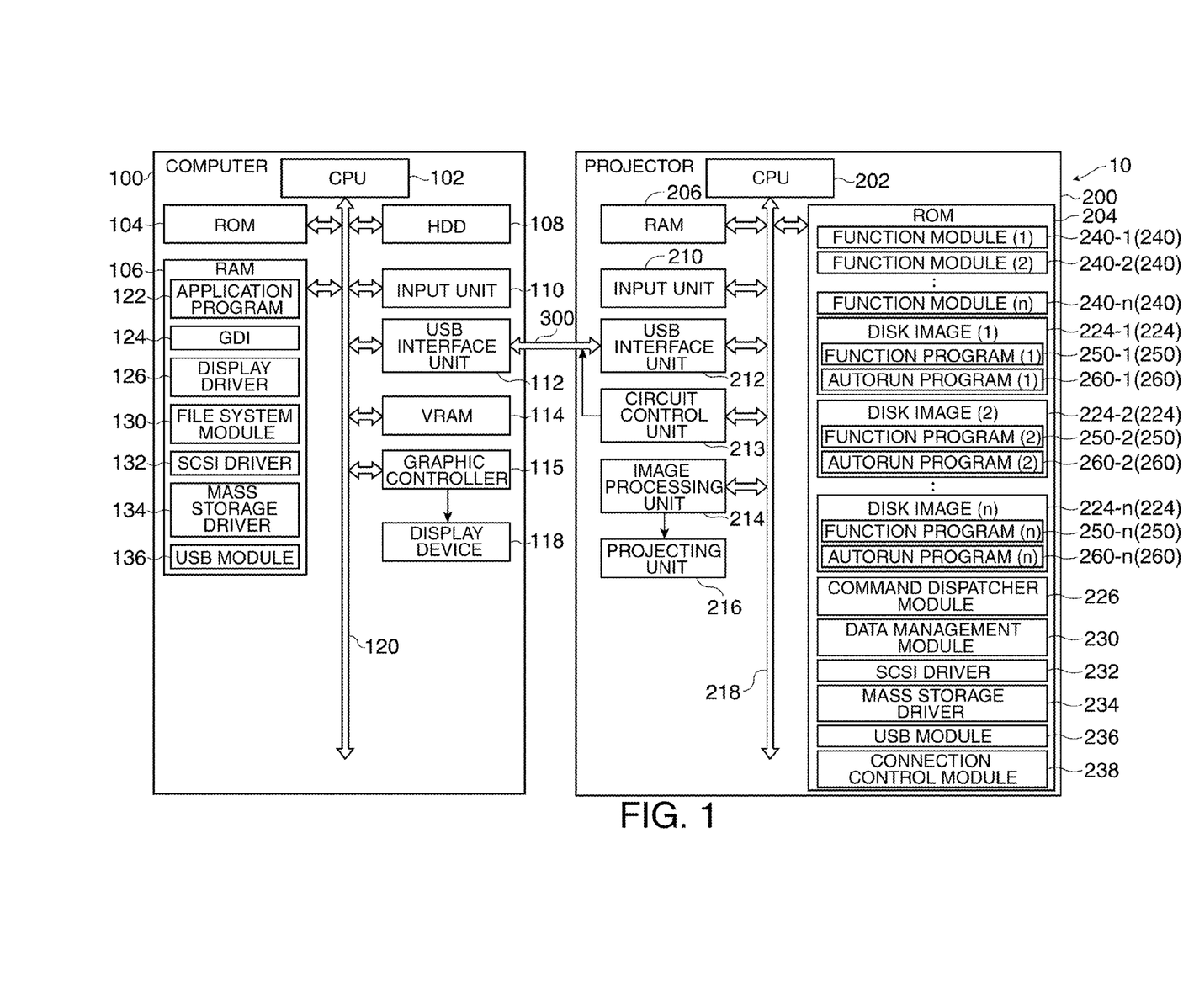
FIG. 1 shows a projector according to an embodiment of the invention.

FIG. 1 is a block diagram showing an image display system 10 of this embodiment.

The image display system 10 includes a PC (or personal computer) 100 functioning as the image supplying apparatus according to the embodiment of the invention, a projector 200 functioning as the image display apparatus according to the embodiment of the invention, a USB (or Universal Serial Bus) cable 300 that connects between the PC 100 and the projector 200.

The PC 100 includes a CPU 102, a ROM (or Read Only Memory) 104, a RAM (or Random Access Memory) 106, an HDD (or Hard Disk Drive) 108, an input unit 110 having a keyboard and/or a pointing device, a USB interface unit 112, a VRAM (or video RAM) 114 functioning as a frame memory, a graphic controller 115, a display device 118 such as a liquid crystal display and a bus 120 that connects those components.

The RAM 106 stores computer programs including an application program 122, a GDI (or Graphics Device Interface) 124, a display driver 126, a file system module 130, a SCSI driver 132, a mass storage driver 134 and a USB module 136. Notably, the GDI 124, display driver 126, file system module 130, SCSI driver 132, mass storage driver 134 and USB module 136 function as a part of the OS (or Operating System) therein. In this embodiment, it is assumed that the OS is Windows (registered trademark) provided by Microsoft Corp.

The GDI 124 is a computer program that centrally manages rendering to the display device 118 or a printing device (not shown). The GDI 124 provides an API (or Application Program Interface) called "GDI function" relating to rendering to an application program. Notably, the API generally refers to a set of procedures for using various functions that the operating system has by the application program.

The application program 122 issues the GDI 124 a request for rendering an image of a presentation sheet included in a presentation file. Generally, the rendering request also includes information on the destination of the output of the image (that is, which the image is to be output to between the display device 118 and a printing device). The GDI 124 receives the rendering request from the application program 122, checks the destination of the output of the image on the basis of the rendering request, and, if the destination of the output is the display device 118, transmits the rendering request to the display driver 126. The display driver 126 renders the image data within the VRAM 114 in accordance with the received rendering request.

Notably, other components of the PC 100 will be described later.

The projector 200 has various functions to be implemented when it is connected to the PC 100. The projector 200 has the functions such as a function that projects a display screen displayed on the display device 118 of the PC 100 and a function that reproduces and projects a video content that the PC 100 holds. The projector 200 is configured to be recognized as a CD-ROM drive when it is connected to the PC 100 through the USB cable 300.

The projector 200 includes a CPU 202, a ROM 204, a RAM 206, an input unit 210 including operation buttons, a USB interface unit 212, a circuit control unit 213, an image processing unit 214, a projecting unit 216 and a bus 218 connecting those components. Among them, the circuit control unit 213 disconnects/connects the pull-up resistor connected to the data line D+ of the USB cable 300, whereby the connection state between the PC 100 and the projector 200 is controlled. The projecting unit 216 includes a light source device, not shown, a liquid crystal panel, not shown, functioning as a light modulator that forms image light by modulating the luminous flux emitted from the light source device in accordance with the image data, and a projection optical device, not shown, that projects image light, which is formed by the liquid crystal panel, in large size to a projection surface such as a screen.

The ROM 204 stores computer programs including plural function modules 240, plural disk images 224, a command dispatcher module 226 (which will also be simply called "dispatcher 226"), a data management module 230, a SCSI driver 232, a mass storage driver 234, a USB module 236 and a connection control module 238.

Figure 2:
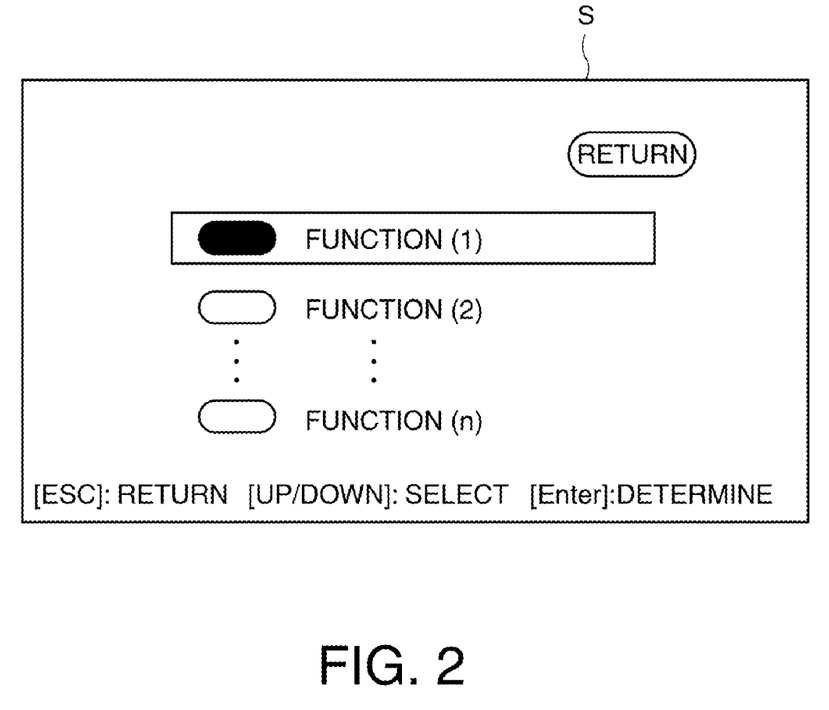
FIG. 2 is a diagram showing a setting screen projected by a projector according to the embodiment.

FIG. 2 is a diagram showing a configuration menu S projected by the projector 200.

If the CPU 202 receives the input of an operation signal that "invoke the configuration menu S relating to a function of the projector 200" from the input unit 110 of the PC 100 or the input unit 210 of the projector 200, the CPU 202 causes the image processing unit 214 to display the configuration menu S shown in FIG. 2. The projector 200 of this embodiment includes the various functions as described above, and the one selected from the functions (1) to (n) displayed on the configuration menu S can be implemented.

The CPU 202 functions as the selecting unit of the embodiment of the invention and selects a disk image 224-1 according to the one of the functions (1) to (n) selected on the configuration menu S. For example, as shown in FIG. 2, if the function (1) that projects the display screen displayed on the display device 118 is selected, the CPU 202 selects the disk image 224-1 according to the function (1). If, for example, the function (2) is selected that reproduces and projects the video content held by the PC 100, the CPU 202 selects a disk image 224-2 according to the function (2).

Each of the function modules 240-1 to n has a unique function according to the corresponding one of the function (1) to (n) of the PC 100. For example, the function module 240-1 has the function that projects a display screen displayed on the display device 118 of the PC 100. More specifically, the function module 240-1 has a function that decodes the encoded image data on the display screen, which is transmitted from the PC 100 (or a function program 250-1, which will be described later) and causes the image processing unit 214 to expand the image data to a display memory within the image processing unit 214 and then input the result to the projecting unit 216. As a result, the display screen displayed on the display device 118 of the PC 100 is projected to the projection surface.

For example, the function module 240-2 has a function that reproduces and projects a video content such as a video file held by the PC 100. More specifically, the function module 240-2 has a function that decodes the encoded video contents, which is transmitted from the PC 100 (or a function program 250-2, which will be described later) and causes the image processing unit 214 to expand the image data constructing the video to a display memory within the image processing unit 214 and input the result to the projecting unit 216. As a result, the video content held by the PC 100 is reproduced and is projected to the projection surface.

Each of the disk images 224-1 to n has a function program 250 having a unique function according to the corresponding one of the functions (1) to (n) of the PC 100 and an autorun program 260 that causes the PC 100 to execute the function program 250. For example, the function program 250-1 according to the function (1) has a function that obtains the image data relating to the display screen of the PC 100 from the VRAM 114 and encodes and transmits the image data.

The function program 250-2 according to the function (2) causes the display screen of the PC 100 to display the screen that prompts a user to select the video contents to be projected by the projector 200. Then, the function program 250-2 further has a function that encodes and transmits the video content selected by a user to transfer data that is compatible with the connection form of the PC 100 and the projector 200. For example, if, as the video content, a video file in MPEG (Moving Picture Experts Group) 2/PS (Program Stream) form is selected, the function program 250-2 converts the video file to that in MPEG 2/TS (Transport Stream) form and transmits the result.

Here, according to this embodiment, if the PC 100 is connected to the projector 200 through the USB cable 300, as described above, the projector 200 is recognized as a CD-ROM drive. Then, if the PC 100 recognizes one of the autorun programs 260-1 to n, which are provided for the corresponding functions (1) to (n) and are stored as "Autorun.inf" files, the PC 100 executes the one of the function program 250-1 to n (or the one of the function program 250-1 to n within the same disk images 224-1 to n) designated in the corresponding one of the autorun programs 260-1 to n.

Notably, the function programs 250-1 to n issue a SCSI command and transmit data along with the SCSI command in transmitting encoded image data or data such as a video content to the projector 200. The SCSI command includes a code describing a command such as "read" and "write" to be issued by one of the function programs 250-1 to n, a code describing that the SCSI command is from one of the function programs 250-1 to n, and a code describing one of the function modules 240-1 to n, which is the destination of the SCSI command and data.

For example, the SCSI command issued by the function program 250-1 includes a code describing that the destination of the SCSI command and image data is the function module 240-1 corresponding to the function program 250-1. The SCSI command issued by the function program 250-2 includes a code describing that the destination of the SCSI command and video content is the function module 240-2 corresponding to the function program 250-2.

The data management module 230 relays the access to one of the disk images 224-1 to n by the PC 100 that recognizes the projector 200 as a CD-ROM drive. The data management module 230 is the switching unit according to the embodiment of the invention. If the CPU 202 newly selects a disk image 224 among the plural disk images 224-1 to n, the disk image 224 recognized by the PC 100 is switched to the one newly selected by the CPU 202 among the disk images 224-1 to n.

The USB modules 136 and 236 control the USB interface units 112 and 212, respectively, so as to interpret the USB protocol for performing data communication. The mass storage drivers 134 and 234 are provided in the upper layers than the USB modules 136 and 236 and perform data communication in accordance with the communication protocol of the mass storage class.

Notably, the mass storage driver 134 corresponds to the USB class driver. The class driver is in the upper layer than the USB bus driver and is a communication control module that performs communication with a USB device on the basis of the communication protocol according to the type of the USB device. Under the USB standard, the types of USB devices are categorized into plural classes. The communication protocols to be applied vary from class to class (that is, from device type to device type). Here, in order to make a USB device having various functions usable, a vender-specific class may be defined. In this case, a special communication protocol (that is, a special class driver) is applied.

On the other hand, for some representative classes, a standardized communication protocol is provided for facilitating the data communication between devices. The "mass storage class" is a one of the classes. The mass storage driver 134 performs data communication on the basis of the communication protocol for the mass storage class. The mass storage driver 134 is not used limitedly by the data storage device by a specific manufacturer but may be shared by data storage devices (such as a CD-ROM drive, a DVD-ROM drive, a hard disk drive and a semiconductor memory) by various manufacturers. In the same manner, a generic data storage device (such as a CD-ROM drive) based on the standardized communication protocol is not used limitedly by a computer by a specific manufacturer but may be used commonly by computers (such as personal computers and information mobile terminals) by various manufacturers.

The dispatcher 226 is provided in the upper layer of the mass storage driver 234 and determines which the supplied data is from between one of the function programs 250-1 to n and the file system module 130 on the basis of the code included in a SCSI command. If the dispatcher 226 determines that the supplied data is from one of the function programs 250-1 to n, the dispatcher 226 transmits the data to the one of the function modules 240-1 to n described by the code in the SCSI command. On the other hand, if the dispatcher 226 determines that the supplied data is from the file system module 130, the dispatcher 226 transmits the data to the SCSI driver 232.

The SCSI drivers 132 and 232 are provided in the upper layers than the mass storage drivers 134 and 234 and use a SCSI command set to perform data communication.

The file system module 130 of the PC 100 issues a data access request to the SCSI driver 132 so as to manage the file system.

On the other hand, the data management module 230 of the projector 200 receives the access request from the PC 100 through the dispatcher 226 and the SCSI driver 232 and, as described above, relays the access by the PC 100 to the one of the disk images 224-1 to n in accordance with the one of the functions (1) to (n) selected by the CPU 202.

Figure 3:
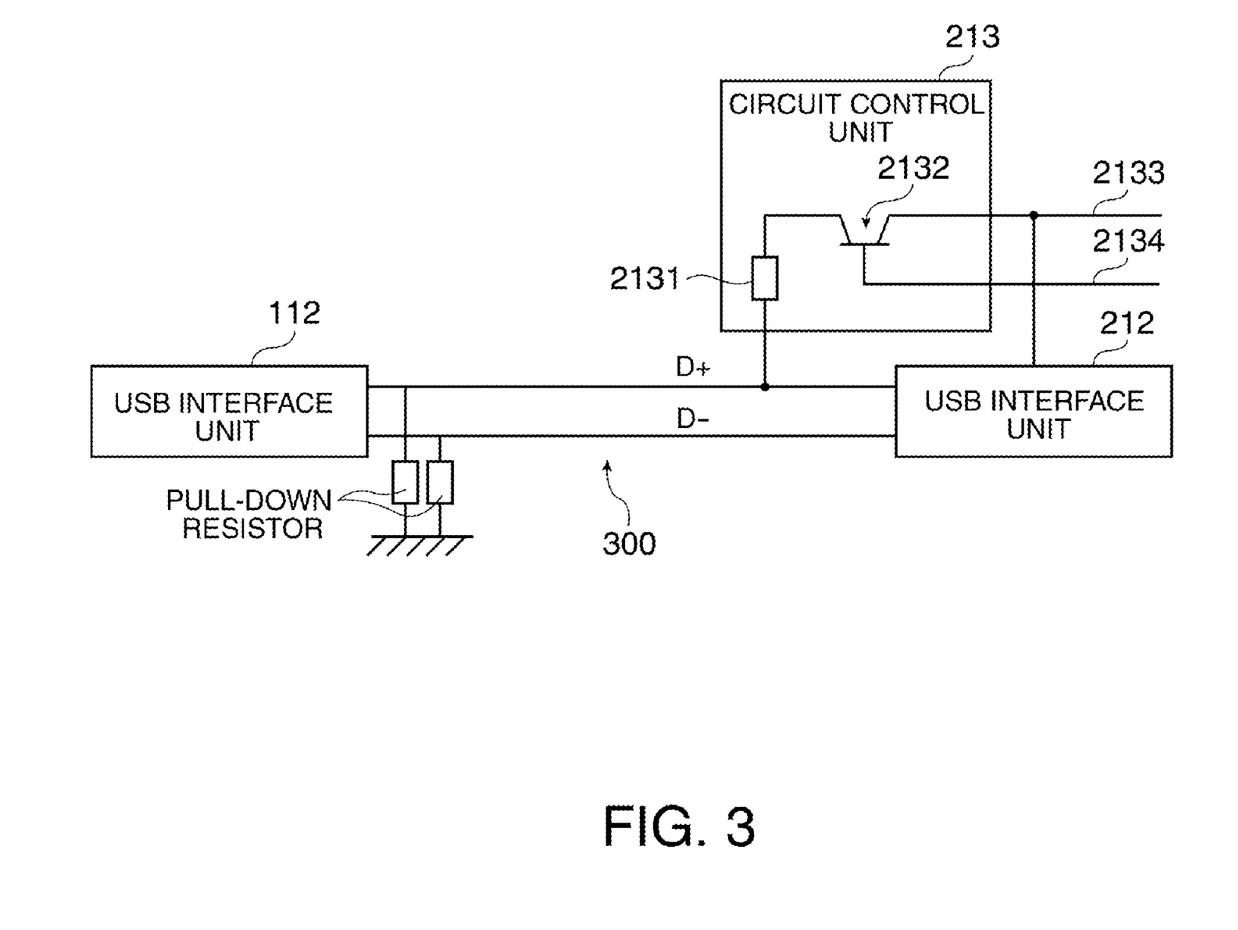
FIG. 3 is a diagram showing a circuit of a circuit control unit according to the embodiment.

FIG. 3 is a diagram showing a circuit of the circuit control unit 213.

The connection control module 238 is the connection control unit of the embodiment of the invention and controls the circuit control unit 213, whereby the logical connection between the projector 200 and the PC 100 is controlled when the PC 100 and the projector 200 are physically connected through the USB cable 300.

The circuit control unit 213 includes, as shown in FIG. 3, a pull-up resistor 2131 connected to the data line D+ of the USB cable 300, a switch element 2132, a power supply line 2133 that applies a predetermined voltage to the pull-up resistor 2131 through the switch element 2132 and a signal line 2134 that outputs a control signal from the connection control module 238 to the switch element 2132 and controls the ON/OFF-states of the switch element 2132.

Here, the USB module 236 of the projector 200 recognizes that the projector 200 has been connected to the PC 100 if the projector 200 is connected to the PC 100 through the USB cable 300 and the data line D+ has a voltage that exceeds the high-level threshold value provided under the USB standard for a predetermined period of time or longer. Conversely, the USB module 236 determines that the projector 200 and the PC 100 have been disconnected if the voltages of both of the data line D+ and D− are equal to or lower than the low-level threshold value.

Accordingly, the connection control module 238 of this embodiment normally turns on the switch element 2132 through the signal line 2134 so as to supply voltage to the pull-up resistor 2131 (and connect the pull-up resistor 2131) and supply voltage to the data line D+. Under this condition, if the CPU 202 newly selects the disk image 224, the connection control module 238 turns off the switch element 2132 so as to stop the application of voltage to the pull-up resistor 2131 (and disconnect the pull-up resistor 2131), whereby the voltage in both of the data line D+ and D− can be equal to or lower than the low-level threshold value. Thus, the USB module 236 is caused to determine that the PC 100 has been disconnected. At that time, in the PC 100, it is determined that the projector 200 has been logically disconnected.

Then, after the data management module 230 changes the disk image 224 recognized by the PC 100 to the disk image 224 newly selected by the CPU 202, the connection control module 238 turns on the switch element 2132 again so as to apply voltage to the pull-up resistor 2131, whereby the USB module 236 is caused to determine that the projector 200 has been connected to the PC 100. At that time, also in the PC 100, the logical connection with the projector 200 is detected.

The control over the application of voltage to the pull-up resistor 2131 allows the connection control module 238 to control the logical connection between the projector 200 and the PC 100 by keeping the physical connection of the USB cable 300 to the projector 200.

Connection Processing

Figure 4:
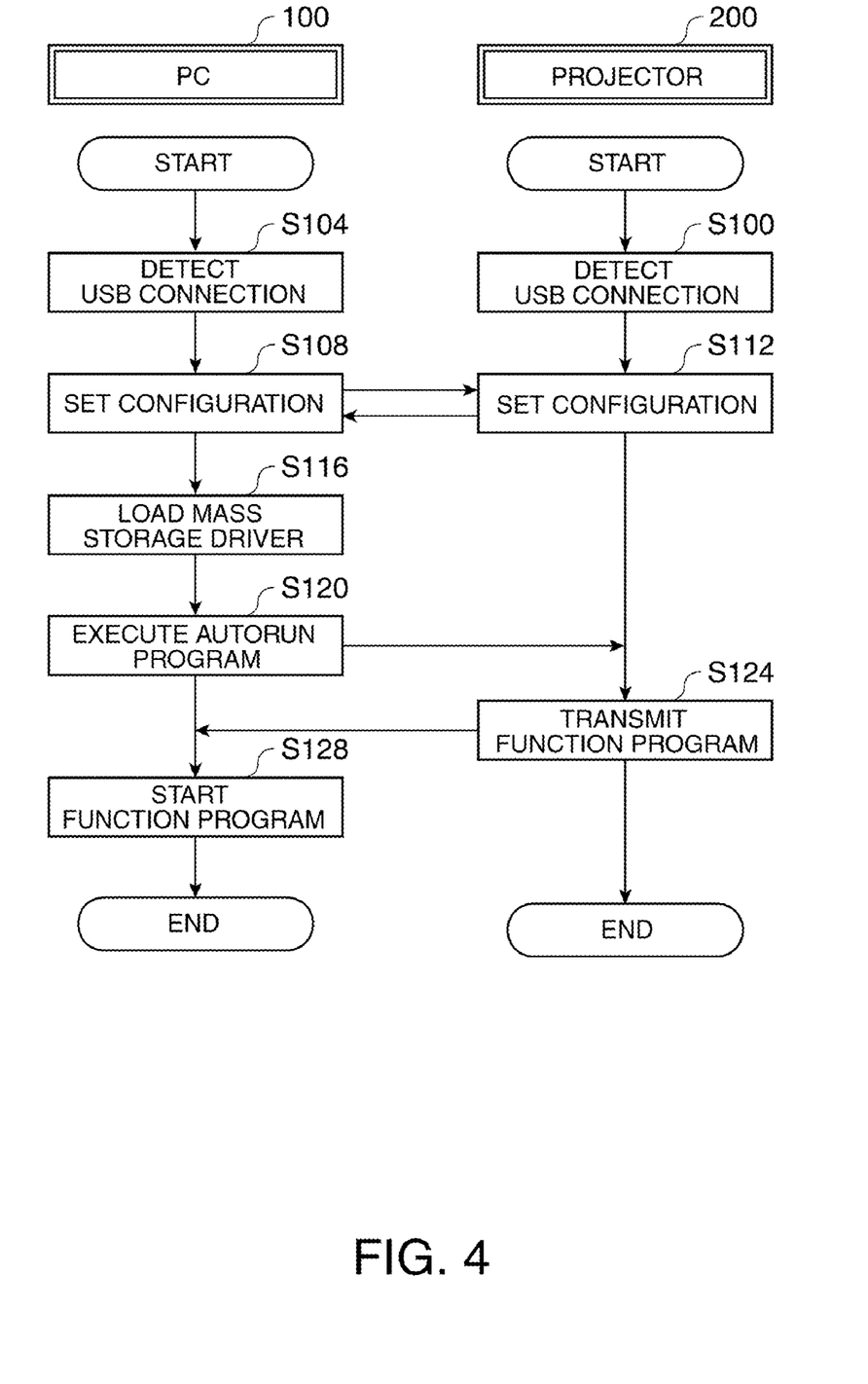
FIG. 4 is a flowchart showing the steps of connection processing according to the embodiment.

FIG. 4 is a flowchart showing steps of the connection processing to be performed when the projector 200 is connected to the PC 100.

The USB module 236 of the projector 200 detects that the projector 200 is connected to the PC 100 through the USB cable 300 (step S100).

On the other hand, the USB module 136 of the PC 100 detects that the projector 200 is connected to the PC 100 through the USB cable 300 (step S104) and, in accordance with the detection, requests the projector 200 the apparatus configuration information (step S108). The apparatus configuration information includes information that the projector 200 operates as a data storage device based on the USB standard. More specifically, the apparatus configuration information includes information describing that the device class (or interface class) of the USB device is the "mass storage class" and information describing that the interface sub-class indicating the command set usable by the "mass storage class" is "SCSI command set".

In accordance with the request, the USB module 236 of the projector 200 transmits the apparatus configuration information to the PC 100 (step S112).

The USB module 136 of the PC 100 receives the apparatus configuration information, identifies the projector 200 as the device that may be categorized into the mass storage class and loads the generic mass storage driver 134 that is basically provided in an OS (step S116). The mass storage driver 134 is built in an OS process in operation. Thus, the PC 100 can perform the data communication with the projector 200 by using the mass storage driver 134.

According to this embodiment, the SCSI driver 132 is also loaded. At that time, the SCSI driver 132 obtains the information describing that the projector 200 is a CD-ROM drive from the SCSI driver 232 of the projector 200. The file system module 130 transmits a SCSI command to the projector 200 through the SCSI driver 132, whereby the projector 200 can be used as the CD-ROM drive. Notably, the SCSI command issued by the file system module 130 is determined by the dispatcher 226 that the SCSI command is from the file system module 130 and is transmitted to the SCSI driver 232. Data may be read from the disk images 224-1 to n by the file system module 130 and the SCSI driver 132. The file system module 130 and the SCSI driver 132 are included in a data read module.

Next, the PC 100 (including the file system module 130 and the SCSI driver 132) recognizes the one selected by the CPU 202 among the disk images 224-1 to n through the data management module 230 of the projector 200 and executes the corresponding one of the autorun programs 260-1 to n within the disk images 224-1 to n (step S120). Thus, the one of the function programs 250-1 to n recorded in the one of the disk images 224-1 to n is transmitted from the projector 200 to the PC 100 (step S124), and the one of the function programs 250-1 to n is started (step S128).

Then, the one of the function programs 250-1 to n executed by the PC 100 and the one of the function modules 240-1 to n of the projector 200 that processes the data transmitted by the one of the function programs 250-1 to n implement the corresponding one of the functions (1) to (n), which is selected on the configuration menu S, of the projector 200.

In other words, if the function of the projector 200 selected by a user is the function (1) that projects an image displayed on the display device 118 of the PC 100, for example, the function program 250-1 corresponding to the function (1) is started in the PC 100. Then, the function program 250-1 obtains and encodes the image data relating to the display screen of the PC 100, and the encoded image data and the SCSI command issued by the function program 250-1 are transmitted to the projector 200 through the USB cable 300.

Then, in the projector 200, the dispatcher 226 determines from the code described by the SCSI command that the received data is from the function program 250-1 and that the destination is the function module 240-1. Then, the dispatcher 226 transmits the encoded image data and the SCSI command to the function module 240-1 corresponding to the function (1) of the projector 200. Then, the function module 240-1 decodes the encoded image data, and the projecting unit 216 projects the display screen of the PC 100 to the projection surface.

Notably, if the function (2) is selected, the function program 250-2 corresponding to the function (2) is executed by the PC 100, and the function module 240-2 functions in the projector 200.

Switching Processing

Figure 5:
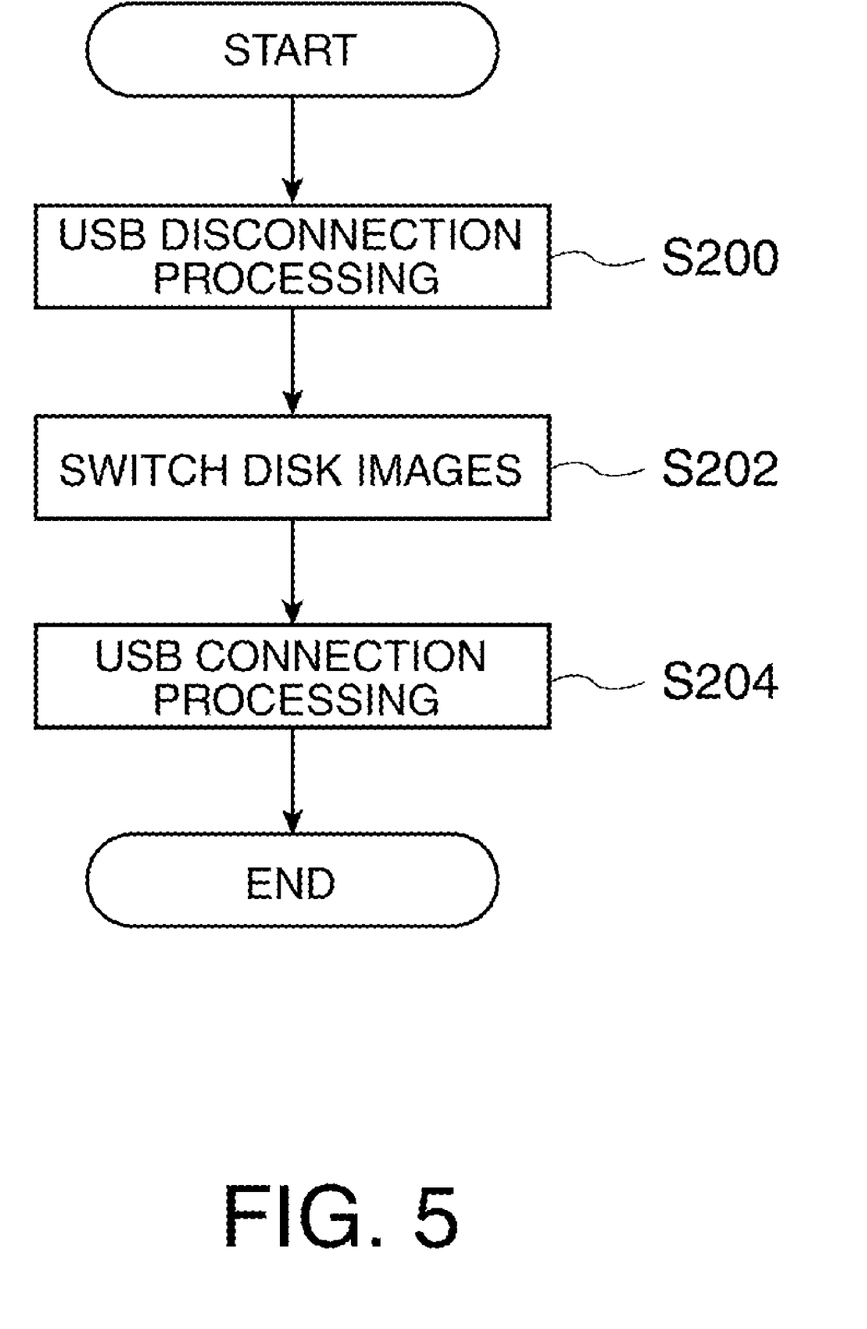
FIG. 5 is a flowchart showing the steps of switching processing according to the embodiment.

FIG. 5 is a flowchart showing steps of the switching processing to be performed when the disk image 224 is newly selected by the CPU 202.

Here, if a user newly selects one of the functions (1) to (n) of the projector 200 on the configuration menu S and the disk image 224 corresponding to the selected one of the functions (1) to (n) is newly selected by the CPU 202, the following processing is performed.

First of all, the connection control module 238 controls the circuit control unit 213 so as to disconnect between the data line D+ of the USB cable 300 and the pull-up resistor 2131 and thus disconnect between the PC 100 and the projector 200 (step S200).

The data management module 230 changes the disk image 224 to be recognized by the PC 100 to the disk image 224 newly selected by the CPU 202 (step S202). The connection control module 238 controls the circuit control unit 213 so as to reconnect between the data line D+ of the USB cable 300 and the pull-up resistor 2131 and thus reconnect between the projector 200 and the PC 100 (step S204).

Thus, the PC 100 this time may recognize the disk image 224-2, for example, through the data management module 230 and execute the autorun program 260-2 stored in the disk image 224-2 and thus execute the function program 250-2 stored in the disk image 224-2. The function program 250-2 displays on the display screen of the PC 100 the screen prompting a user to select a video content to be projected by the projector 200. Then, the function program 250-2 encodes the video content selected by the user and transmits it to the function module 240-2. Then, the function module 240-2 decodes the video content, and the projecting unit 216 projects a moving picture relating to the video content onto the projection surface.

The image display system 10 and the projector 200 of this embodiment as described above provide the following effects.

Because the data management module 230 switches one of the disk images 224-1 to n to be recognized by the PC 100 to the one, which is selected by the CPU 202, among the plural disk images 224-1 to n, the PC 100 can execute the function programs 250-1 to n that are included in the disk images 224-1 to n respectively. In other words, the PC 100 can execute the function programs 250-1 to n having various functions. The data transmitted from the one, which is executed by the PC 100, of the function programs 250-1 to n to the projector 200 is processed by the corresponding one of the function modules 240-1 to n corresponding to the executed one of the function programs 250-1 to n. Therefore, without installation by a user of the function programs 250-1 to n to the PC 100, various functions can be implemented, which can enhance the convenience of the projector 200.

In order to switch the disk images 224-1 to n to be recognized by the PC 100 by the data management module 230, the connection control module 238 once disconnects the PC 100 and the projector 200. Therefore, the data management module 230 can securely switch the disk images 224-1 to n to be recognized by the PC 100.

The disconnection of the pull-up resistor 2131 by the connection control module 238 disconnects between the PC 100 and the projector 200. Therefore, the switching of the disk images 224-1 to n by the data management module 230 does not require pulling-out and plugging-in the USB cable 300, which enhances the convenience of the projector 200.

The disk images 224-1 to n includes the autorun programs 260-1 to n that cause the PC 100 to execute the function programs 250-1 to n that are included in the disk images 224-1 to n respectively. Thus, when the PC 100 recognizes one of the disk images 224-1 to n, the PC 100 can be automatically caused to execute the corresponding one of the autorun programs 260-1 to n. Therefore, the PC 100 can be securely caused to automatically execute the one of the function programs 250-1 to n within the one, which is selected by the CPU 202, of the disk images 224-1 to n.

Because the USB module 236 of the projector 200 transmits the identification information (device class (or interface class)) identifying of a generic device (or mass storage class) to the PC 100, the data communication (such as transfer of image data) can be performed through the USB interface units 112 and 212, without the installation of a special device driver for the projector 200 to the PC 100. The projector 200 is identified as a data storage device (or mass storage class) for which a communication protocol is designed so as to prevent excessive decrease in transfer rate of data to the data storage device. Therefore, the data transfer rate can be increased, and the frequency of data update can be increased.

Variation of Embodiment

Notably, the invention is not limited to the embodiment, but variations and improvements within the scope that can provide the advantages of the invention are included in the invention.

Having described according to the embodiment that the projector 200 is configured as a high-speed function device having the pull-up resistor connected to the data line D+, it may be configured as a low-speed function device having the pull-up resistor connected to the data line D−.

Having described according to the embodiment that the function modules 240-1 to n correspond to the function programs 250-1 to n, respectively, one function module may correspond to plural function programs.

Having described according to the embodiment that the interface sub-class of a mass storage class corresponds to the "SCSI command set", the sub-class may be any one (such as "ATAPI") of other various classes.

Having described according to the embodiment that the device type of the projector 200, which is identified by the PC 100, is "mass storage class", the types (classes) for generic devices may vary. Because the communication protocol is standardized for such classes for generic devices, the data communication between the PC 100 and the projector 200 can be performed easily. Furthermore, many drivers for the classes may widely spread and may often be built in various apparatus having USB interfaces. Therefore, without the installation of any special driver, the data communication between the PC 100 and the projector 200 can be performed. In this case, the development of the special driver can be omitted. As the results, the effort for using the projector 200 can be reduced. Preferably, a class is adopted that is designed so as to prevent the excessively low data transfer rate from the PC 100 to the projector 200. For example, one may be adopted which is arbitrarily selected from "Audio", "Mass Storage", and "Communication Device".

Having described according to the embodiment that the projector 200 is identified as a CD-ROM drive by the PC 100, it may be identified as any one of various data storage devices (such as a DVD-ROM drive and a hard disk drive).

Having described according to the embodiment that the PC 100 and the projector 200 are connected through the USB cable 300, the PC 100 and the projector 200 may be connected by radio through a wireless USB, for example.

Having described according to the embodiment that the projector 200 includes the function module 240-2 that has a function of causing the projecting unit 216 to project a moving picture when the video content is obtained, the projector 200 may include a function module that has a function of obtaining a video content and storing it in the ROM 204 without playing the moving picture. Constructing an storage of the moving picture with a nonvolatile memory like a flash memory is preferable. In this case, even after the projector 200 and the PC 100 are disconnected, a user can play the video content whenever he or she wants.

Having described according to the embodiment that a PC is used as the image supplying apparatus, a mobile terminal such as a PDA may be used as the image supplying apparatus.

As the image display apparatus, any one of various display apparatus may be used excluding projectors.

Having described according to the embodiment that the projector 200 includes a liquid crystal panel as the light modulator, the liquid crystal panel may be a transmissive liquid crystal panel in which the plane of light incidence and the plane of light emission are different or may be a reflective liquid crystal panel in which the plane of light incidence and the plane of light emission are the same. The projector 200 may include a DMD (Digital Micromirror Device, the trademark of Texas Instruments Incorporated in the US) as the light modulator.

The invention is applicable to an image display system including an image supplying apparatus such as a computer and a mobile terminal and an image display apparatus such as a projector and an image display apparatus such as a projector.

What is claimed is:

1. An image display apparatus that displays an image in accordance with image data supplied from a separate image supplying apparatus, the image display apparatus comprising:

a function module that processes input data;

a plurality of disk images stored in memory, each of the plurality of disk images including:
  a function program which is executed by the image supplying apparatus and transmits data to the function module, an autorun program corresponding to the function program and the disk image, the autorun program automatically causing the image supplying apparatus to execute the corresponding function program in response the image supplying apparatus recognizing the corresponding disk image;

a selecting unit that selects a first disk image of the plurality of disk images;

a switching unit that switches from a second disk image of the plurality of images that is recognized by the image supplying apparatus to the first disk image; and a connection control unit that, before the switching from the second disk image to the first disk image by the switching unit, disconnects between the image display apparatus and the image supplying apparatus in response to the selecting unit selecting the first disk image and, after the switching from the second disk image to the first disk image by the switching unit, connects between the image display apparatus and the image supplying apparatus;

wherein:
  the function program included in the first disk image is executed by the image supplying apparatus that recognizes the first disk image; and
  the function module processes the data transmitted from the function program executed by the image supplying apparatus.

2. The image display apparatus according to claim 1, wherein:
  the image display apparatus and the image supplying apparatus are connected through a USB cable; and
  the connection control unit:
    disconnects a pull-up resistor connected to a data line of the USB cable so as to disconnect between the image display apparatus and the image supplying apparatus; and
    connects the pull-up resistor so as to connect between the image display apparatus and the image supplying apparatus.

3. An image display system comprising:
an image display apparatus that displays an image in accordance with supplied image data; and
an image supplying apparatus that is separate from the image display apparatus and that is connected to the image display apparatus and supplies the image data to the image display apparatus, wherein
the image display apparatus has
- a function module that processes input data,
- a plurality of disk images stored in memory, each of the plurality of disk images including:
  - a function program which is executed by the image supplying apparatus and transmits data to the function module,
  - an autorun program corresponding to the function program and the disk image, the autorun program automatically causing the image supplying apparatus to execute the corresponding function program in response the image supplying apparatus recognizing the corresponding disk image,
- a selecting unit that selects a first disk image of the plurality of disk images,
- a switching unit that switches from a second disk image of the plurality of images that is recognized by the image supplying apparatus to the first disk image, and
- a connection control unit that, before the switching from the second disk image to the first disk image by the switching unit, disconnects between the image display apparatus and the image supplying apparatus in response to the selecting unit selecting the first disk image and, after the switching from the second disk image to the first disk image by the switching unit, connects between the image display apparatus and the image supplying apparatus;
the image supplying apparatus recognizes the first disk image and executes the function program included in the first disk image; and
the function module processes the data transmitted from the function program.

4. A method of displaying an image on an image display apparatus in accordance with image data supplied from a separate image supplying apparatus, the image display apparatus including a plurality of disk images stored in memory, each of the plurality of disk images including a function program which is executed by the image supplying apparatus and transmits data to a function module, the method comprising:
- processing, by the function module, input data input to the image display apparatus;
- selecting, by a selecting unit, a first disk image of the plurality of disk images;
- switching, by a switching unit, from a second disk image of the plurality of images that is recognized by the image supplying apparatus to the first disk image;
- before the switching from the second disk image to the first disk image by the switching unit, disconnecting, by a connection control unit, between the image display apparatus and the image supplying apparatus in response to the selecting unit selecting the first disk image;
- after the switching from the second disk image to the first disk image by the switching unit, connecting, by the connection control unit, between the image display apparatus and the image supplying apparatus; and
- processing, by the function module, data transmitted from the function program included in the first disk image, the first disk image having been executed by the image supplying apparatus that recognizes the first disk image,
- wherein each of the plurality of disk images includes an autorun program corresponding to the function program and the disk image, the autorun program automatically causing the image supplying apparatus to execute the corresponding function program in response the image supplying apparatus recognizing the corresponding disk image.

* * * * *